(12) United States Patent
Mayes et al.

(10) Patent No.: US 10,487,914 B2
(45) Date of Patent: Nov. 26, 2019

(54) TWO-FACED FABRIC WITH PARTIALLY ORIENTED YARN

(71) Applicants: Charles Mayes, Lumberton, NC (US); James Rollings Newsome, Cheraw, SC (US)

(72) Inventors: Charles Mayes, Lumberton, NC (US); James Rollings Newsome, Cheraw, SC (US)

(73) Assignee: Highland Industries, Inc., Kernersville, NC (US)

( * ) Notice: Subject to any disclaimer, the term of this patent is extended or adjusted under 35 U.S.C. 154(b) by 206 days.

(21) Appl. No.: 15/681,545

(22) Filed: Aug. 21, 2017

(65) Prior Publication Data

US 2019/0056010 A1 Feb. 21, 2019

(51) Int. Cl.
| F16G 1/10 | (2006.01) |
| F16G 1/28 | (2006.01) |
| B29D 29/08 | (2006.01) |
| B29K 105/08 | (2006.01) |
| F16G 5/20 | (2006.01) |
| F16G 5/08 | (2006.01) |

(52) U.S. Cl.
CPC .............. *F16G 1/10* (2013.01); *B29D 29/08* (2013.01); *F16G 1/28* (2013.01); *F16G 5/08* (2013.01); *F16G 5/20* (2013.01); *B29K 2105/0836* (2013.01); *D10B 2331/04* (2013.01); *D10B 2403/0231* (2013.01)

(58) Field of Classification Search
CPC .. F16G 1/28; F16G 1/10; B29D 29/08; B65G 15/54; D03D 1/0094

USPC ......................................................... 474/205
See application file for complete search history.

(56) References Cited

U.S. PATENT DOCUMENTS

| 3,609,999 | A | * | 10/1971 | Blore | D04B 1/126 |
| | | | | | 66/96 R |
| 5,645,504 | A | * | 7/1997 | Westhoff | F16G 1/28 |
| | | | | | 474/250 |
| 5,653,655 | A | * | 8/1997 | Onoe | B29D 29/08 |
| | | | | | 474/205 |
| 6,409,621 | B1 | * | 6/2002 | Billups | F16G 1/08 |
| | | | | | 474/260 |
| 9,243,682 | B2 | | 1/2016 | Avery et al. | |
| 9,528,570 | B2 | * | 12/2016 | Baltes | F16G 5/08 |
| 9,599,189 | B2 | * | 3/2017 | Newsome | F16G 1/10 |
| 2006/0105874 | A1 | * | 5/2006 | Shimamura | F16G 1/28 |
| | | | | | 474/266 |
| 2014/0083824 | A1 | * | 3/2014 | Shoji | B65G 15/54 |
| | | | | | 198/846 |
| 2014/0087904 | A1 | * | 3/2014 | Avery | D03D 1/0094 |
| | | | | | 474/267 |
| 2015/0246776 | A1 | * | 9/2015 | Shoji | B65H 5/02 |
| | | | | | 198/846 |

(Continued)

FOREIGN PATENT DOCUMENTS

EP 0 100 637 2/1984

*Primary Examiner* — Henry Y Liu
(74) *Attorney, Agent, or Firm* — Tuggle Duggins P.A.; Blake P. Hurt

(57) ABSTRACT

A two-faced, modified interlock knit fabric for use in the manufacture of toothed belts, the fabric constructed by plating a partially oriented first yarn of polyester or nylon with a second yarn of polyester or spun cotton and knit in a blister stitch in the machine direction is provided. A method of forming toothed belts incorporating such a fabric is also provided.

8 Claims, 2 Drawing Sheets

(56) References Cited

U.S. PATENT DOCUMENTS

2016/0053851 A1\* 2/2016 Kojima .................... F16G 5/20
474/265

\* cited by examiner

TWO-FACED FABRIC WITH PARTIALLY ORIENTED YARN

FIELD OF THE INVENTION

The invention herein pertains to reinforcing fabrics and particularly pertains to a two-faced fabric formed by partially oriented yarn for use in the formation of tooth structures during the manufacture of belts.

DESCRIPTION OF THE PRIOR ART AND OBJECTIVES OF THE INVENTION

Cogged or grooved power transmission belts, such as continuously variable transmission (CVT) belts, timing belts and poly v-belts, often utilize a cog and groove covering fabric along the inner portion of the belt which contacts the drive motor shaft to prevent cracking and to provide reinforcement and wear resistance during belt use. Previous attempts to reinforce these belts included attempts to utilize a woven fabric formed with polyamide yarns, but such fabric substrates have limitations. For one, elongation is generally limited to only one direction with such woven fabrics, which restricts cog/groove formation during belt production. In addition, while woven fabric has excellent performance strike-through characteristics, it is quite expensive to manufacture. Further, even fabrics formed from engineered yarns may often need to be "turned" to define sufficient elongation or stretch in the proper direction for the belt building and tooth formation process. To accomplish effective manufacture of a covered, toothed belt, a lateral width stretch fabric has to be cut and "turned" or rotated ninety degrees (90°) to allow the stretch factor to be in the longitudinal length direction to accommodate tooth formation. U.S. Pat. No. 9,599,189, owned by the instant applicant and incorporated in its respective entirety herein, sought to address this problem by disclosing a woven fabric with a high stretch residing in the longitudinal or "warp" direction since belt sizes and splices in the belts are controlled by the width of the fabric.

Knitted fabrics could be much cheaper to manufacture and provide some elongation in both the machine and the cross-machine direction. However, because knitted fabrics have a propensity to stretch, inter-yarn interstitial spaces are created, which permits excessive strike-through. This is also an unacceptable characteristic. U.S. Pat. No. 9,243,682, owned by the instant applicant and incorporated in its respective entirety herein, sought to address this problem by knitting textured yarns in at least the cross machine direction to form a fabric substrate that defines a high degree of elongation while reducing the occurrence of "strike-through" or "pinheads" that may arise when belt body material traverses the interstitial spaces of fabric during the tooth/groove formation process. Regardless, there still exists a need for a knitted fabric substrate that defines significant elongation in both directions and satisfactory air permeability characteristics without having to turn the material during formation of the tooth structure during belt manufacture.

Thus, in view of the problems and disadvantages associated with prior art devices, the present invention was conceived and one of its objectives is to provide a two-faced fabric for use in connection with toothed belt construction.

It is another objective of the present invention to provide a two-faced fabric with each face defined by a modified interlock knit.

It is still another objective of the present invention to provide a two-faced fabric formed via a plated construction with a first yarn and a second yarn, the first and second yarns formed from different materials.

It is yet another objective of the present invention to provide a two-faced fabric defining a blister stitch construction.

It is a further objective of the present invention to provide a two-faced fabric with a partially oriented polyester or nylon yarn plated with a second yarn of cotton or polyester.

It is still a further objective of the present invention to provide a two-faced fabric formed with at least one partially oriented yarn to accommodate a wide range of tooth designs in the formation of a toothed belt.

It is yet a further objective of the present invention to provide a two-faced fabric that defines significant elongation characteristics in both directions while avoiding the need to turn the fabric during construction to achieve the satisfactory elongation characteristics in both directions.

Various other objectives and advantages of the present invention will become apparent to those skilled in the art as a more detailed description is set forth below.

SUMMARY OF THE INVENTION

The aforesaid and other objectives are realized by providing a two-faced fabric for use in the manufacture of toothed belts, the fabric knit as a 2-sided, modified interlock constructed by plating a partially oriented first yarn of polyester or nylon with a second yarn of polyester or spun cotton and knit as a blister stitch in the machine direction. The two-faced design of the fabric incorporating the partially oriented yarn permits effective and efficient tooth formation in a belt or other molded design due to the nature of the plated and blistered construction accompanied by the thermal dynamics defined by the partially oriented yarn when heated. The double face with plated thread design offers performance advantages to limit or control belt material such as rubber forming pinheads (i.e. strike-through) compared to the prior art. The inclusion of partially oriented yarn contributes to reduced finishing requirements for the finished fabric to meet stretch mandates for tooth formation, and bestows the fabric with advantageous variability to accommodate an increased number of tooth designs since said formation is controlled by heated molding of the partially oriented yarn, and not based on pre-determined fabric stretch properties.

DETAILED DESCRIPTION OF THE PREFERRED EMBODIMENT AND OPERATION OF THE INVENTION

Figure 1:
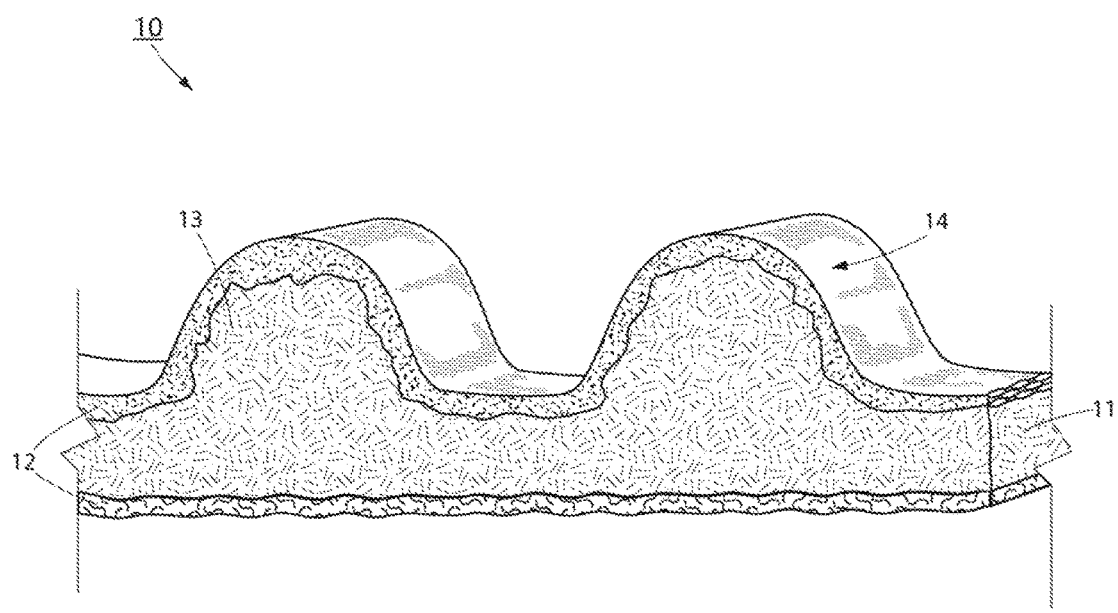
FIG. 1 shows a perspective view of a portion of a belt including a fabric.
Figure 2:
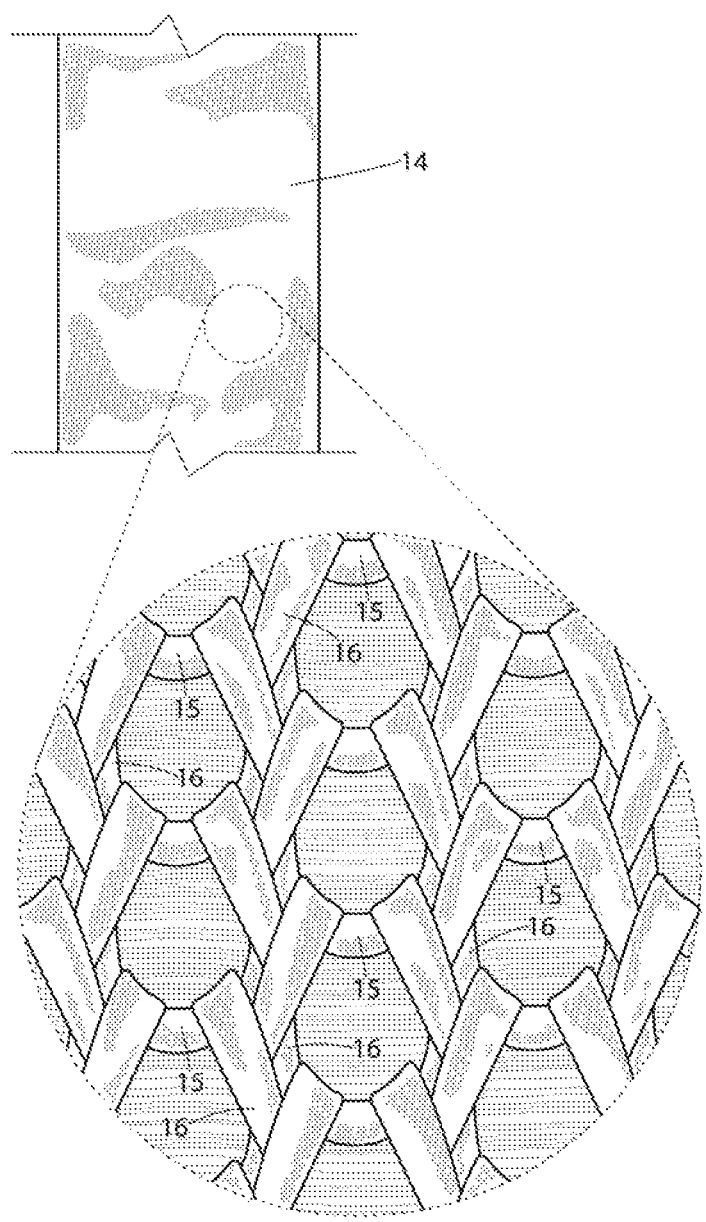
FIG. 2 pictures a planar view of the fabric of FIG. 1 with a portion magnified to illustrate the knit construction of said fabric.

For a better understanding of the invention and its operation, turning now to the drawings, FIG. 1 illustrates toothed belt 10 formed from interior or core material 11 defining at least one or more exterior surfaces 12 including a plurality of teeth 13. Toothed belt 10 is typically circular, but it should be understood that the exact measurements and configurations of toothed belt 10 should not be construed as a limitation on toothed belt 10. Embodiments of belt 10 are formed from interior materials 11 such as rubber, polymeric derivatives, and other belt materials as are known in the art. Toothed belt 10 may be used in mechanical modes, for example in the automotive context to contact a drive motor shaft with one or more teeth 13 to transmit rotational energy for uses such as an alternator, power steering pump, water pump, air conditioning compressor, air pump and the like (not shown). Due to the harsh operating environments of toothed belt 10, for example when disposed as a belt-in-oil, it is not uncommon for a toothed belt 10 to degrade over time and structurally fail. Therefore, preferred toothed belt 10 further includes fabric 14 attached to one or more exterior surfaces 12 and covering a plurality of teeth 13. In addition to structural protection, embodiments of fabric 14 may convey abrasion resistance properties, chemical resistance properties, stretch resistance properties, or other desirable properties.

Preferred fabric 14 is a knitted web formed with a modified interlock utilizing a blistered construction (also known as a blister stitch, or simply "blistered"). As would be understood, the term "modified interlock" in this context refers to a fabric that is formed by knitting one stitch atop another, and in the preferred embodiment, the stitch is known as a blister stitch, which creates the appearance of a chain defined by circular or hexagonal shapes formed atop a solid backing. Embodiments of fabric 14 may be formed from a number of different methods such as weaving, braiding, extruding, or other textile construction methods as are known in the art but the preferred method of formation for fabric 14 is knitting the fabric and then attaching it to exterior surface 12 of toothed belt 10 as the belt is molded to define teeth 13. The knitting pattern in a knit construction may be selected for aesthetics or visual appearance, but the preferred pattern may also convey structure advantages, such as enhanced structural stability or increased abrasion resistance and increased blocking of rubber from interior side of belt to flow through to the exterior surface, and thus should not be considered merely a design choice. The stitch pattern may also affect the use of the fabric, as certain patterns may form spaces between the yarns, for example allowing some fluids such as air or water to pass through the fabric while restricting other fluids such as oil or liquefied polymers and rubbers. An embodiment of fabric 14 may be double-faced, in that there are two right faces of the fabric.

Embodiments of fabric 14 may be formed by knitting one or more species of yarn as described above. While certain yarns, threads, filaments, or the like may incorporate more than one material therein, the typical practice in knitting on a commercial scale is to select a single yarn formed by a single material to generate a given fabric. The practice of "plating" consists of alternating or periodically switching the yarn being knit during the formation of a fabric. Often, plating decisions are driving by aesthetics, as varying the color of the yarn may produce unique design results, but fabric 14 advantageously utilizes a plated construction by relying on first yarn 15 and second yarn 16, whereby it should be understood that first yarn 15 and second yarn 16 are formed from different materials. In one embodiment, first yarn 15 is defined as a partially oriented yarn (POY) formed from a polymeric material such as polyester, the nature and characteristics of POY yarns described more fully below, while second yarn 16 is formed from a cotton material, for example 100% spun cotton. In another embodiment, first yarn 15 is defined as a POY formed from nylon and second yarn 16 is formed from polyester. These two combinations are provided by way of example, and in no way are intended to be construed as a limitation on the nature of first yarn 15 and second yarn 16. However, the polyester/cotton and nylon/polyester examples have demonstrated exceptional elongation characteristics and limit or control of rubber strikethrough during the belt manufacturing process. Specifically, the use of a POY first yarn 15 in combination with a secondary yarn 16 has resulted in a fabric 14 with a far greater range of applications than demonstrated in the prior art, particularly in comparison to woven fabrics that are often engineered for specific belt characteristics, for example factors relating to tooth dimensions. Due in part to the incorporation of POY first yarn 15, fabric 14 has demonstrated statistically significant elongation in both the longitudinal and lateral directions without requiring that the fabric be turned during finishing.

When polymeric yarns such as polyester or nylon are manufactured, they are typically extruded and allowed to cool, during which time the structures contained therein (sometimes referred to as filaments) may be manipulated, pulled, and/or aligned in a certain configuration enhancements. Known as "drawing" the yarn, this mechanical manipulation of the yarn filaments is one way that a particular yarn's characteristic(s) can be engineered for a particular use, for example in connection with the specific tooth dimensions of a given belt. One downside to this process is that once the yarn is drawn, the yarn cools and the selected properties are generally "set" (considered more or less permanent). By comparison, partially oriented yarn, as compared to "fully drawn yarn" as it is known as described above, even when formed from the same material and by the name manufacturing process, may maintain a greater degree of mechanical flexibility, either by not drawing the yarn at all, or by subjecting the POY to a lesser degree of mechanical stimulation in comparison to the fully drawn yarn. By not drawing the POY, or drawing it to a lesser degree than the fully drawn yarn, some of the mechanical properties of the POY, specifically as they relate to elongation and permeability, may be determined at a later time. This is possible because of the thermal properties of the POY, which can remain with certain properties undifferentiated until heated, for example when placed into a mold to form teeth 13 on belt 10. Unlike the fully drawn yarn, which has all or nearly all of its characteristics preordained, it can be determined at the time of tooth formation how much elongation (in one or more directions) will be asked of the POY. Simply stated, in practice it is challenging to know ahead of time just how much a fabric will need to stretch to facilitate proper tooth formation, which is why the industry is quite familiar with tooth formation failure, leading to surprisingly high scrap rates.

A method of forming belt 10 may include one or more of the following steps: a first yarn 15 is defined by a polymeric material such as polyester or nylon and is extruded as is conventional, but instead of fully drawing the yarn filaments, the first yarn 15 is considered a partially oriented yarn and is not mechanically engaged to the degree typical of fully drawn yarns. A second yarn 16 defined by a different material than first yarn 15, for example spun cotton or polyester, is provided and first yarn 15 and second yarn 16 are knitted together to form a fabric. In the preferred embodiment, yarns 15 and 16 are blister stitched together in a modified interlock knit run in the machine direction to define a 2-faced, modified interlocked fabric 14. In an embodiment, fabric 14 is circular knit, but unlike prior art knits, fabric 14 need not be turned as a finishing requirement to demonstrate advantageous elongation characteristics in the lateral and longitudinal directions, for example of the type desirable in the manufacture of toothed belts. One or more embodiments of fabric 14 may undergo bulking, slitting, drying, stabilizing, coating, or other finishing steps after which preferred fabric 14 is then molded to exterior surface 12 of toothed belt 10 and pressure and heat are used to form teeth 13, producing belt 10 that needs less processing time but which has also proven to greatly reduce scrap rate in tooth formation.

The illustrations and examples provided herein are for explanatory purposes and are not intended to limit the scope of the appended claims.

We claim:

1. A toothed belt comprising a rubber core material defining at least one exterior surface with a plurality of teeth, and a fabric knit into a modified interlock defined by a blister stitch construction formed from a first, partially oriented yarn and a second yarn, whereby the first yarn is formed from a different material than the second yarn.

2. The toothed belt of claim 1 whereby the first yarn is formed from polyester.

3. The toothed belt of claim 2 whereby the second yarn is formed from cotton.

4. The toothed belt of claim 3 whereby the cotton yarn is defined as 100% spun cotton.

5. The toothed belt of claim 1 whereby the first yarn is formed from nylon.

6. The toothed belt of claim 5 whereby the second yarn is fowled from polyester.

7. The toothed belt of claim 1 whereby the knit fabric defines two right faces.

8. The toothed belt of claim 1 whereby one or more stretch characteristics of the knit fabric are determined by heating the first yarn, and not predetermined at the time of fabric formation.

* * * * *